United States Patent
Malueg

(10) Patent No.: US 6,393,857 B1
(45) Date of Patent: May 28, 2002

(54) GOLF CART COOLING APPARATUS

(76) Inventor: Steven E. Malueg, 17912 N. 86th La., Peoria, AZ (US) 85382

( * ) Notice: Subject to any disclaimer, the term of this patent is extended or adjusted under 35 U.S.C. 154(b) by 0 days.

(21) Appl. No.: 09/780,154

(22) Filed: Feb. 9, 2001

(51) Int. Cl.[7] .............................................. F28D 5/00
(52) U.S. Cl. ............................. 62/310; 62/239; 62/244; 62/259.4
(58) Field of Search ..................... 62/244, 239, 259.4, 62/91, 314, 304, 310

(56) References Cited

U.S. PATENT DOCUMENTS 4,807,813 A * 2/1989 Coleman .................... 239/153
6,112,538 A * 9/2000 Strussion .................... 62/304
6,151,907 A * 11/2000 Hale ........................... 62/314

* cited by examiner

*Primary Examiner*—William Doerrler
*Assistant Examiner*—Mel Jones

(57) ABSTRACT

A golf cart cooling apparatus for cooling golfers seated in a golf cart. The cooling apparatus includes a reservoir for holding a liquid such as water. A pump is provided for pumping the liquid out of the reservoir. The pump is in liquid communication with the reservoir by a tube or by being mounted on the reservoir. A conduit assembly is provided for spraying the liquid from the reservoir to a position generally adjacent to the golfers in the cart. Activation of the pump diffuses a mist of the liquid over the golfers.

11 Claims, 2 Drawing Sheets

GOLF CART COOLING APPARATUS

BACKGROUND OF THE INVENTION

1. Field of the Invention

The present invention relates to cooling devices and more particularly pertains to a new golf cart cooling apparatus for cooling golfers seated in a golf cart.

2. Description of the Prior Art

The use of cooling devices is known in the prior art. More specifically, golf cart cooling devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 3,583,174; U.S. Pat. No. 5,613,371; U.S. Pat. No. 3,738,621; U.S. Pat. No. 4,360,368; U.S. Pat. No. Des. 294,636; and U.S. Pat. No. 5,285,654.

While these devices fulfill their respective, particular objectives and requirements, the aforementioned patents do not disclose a new golf cart cooling apparatus. The inventive device includes a reservoir for holding a liquid such as water. A pump is provided for pumping the liquid out of the reservoir. The pump is in liquid communication with the reservoir by means of a tube or by being directly mounted on the reservoir. A conduit assembly is provided for spraying the liquid from the reservoir to a position generally adjacent to the golfers in the cart. Activation of the pump diffuses a mist of the liquid over golfers.

In these respects, the golf cart cooling apparatus according to the present invention substantially departs from the conventional concepts and designs of the prior art, and in so doing provides an apparatus primarily developed for the purpose of cooling golfers seated in a golf cart.

SUMMARY OF THE INVENTION

In view of the foregoing disadvantages inherent in the known types of cooling devices now present in the prior art, the present invention provides a new golf cart cooling apparatus construction wherein the same can be utilized for cooling golfers seated in a golf cart.

The general purpose of the present invention, which will be described subsequently in greater detail, is to provide a new golf cart cooling apparatus apparatus and method which has many of the advantages of the cooling devices mentioned heretofore and many novel features that result in a new golf cart cooling apparatus which is not anticipated, rendered obvious, suggested, or even implied by any of the prior art cooling devices, either alone or in any combination thereof.

To attain this, the present invention generally comprises a reservoir for holding a liquid such as water. A pump is provided for pumping the liquid out of the reservoir. The pump is in liquid communication with the reservoir by a tube or by being mounted on the reservoir. A conduit assembly is provided for spraying the liquid from the reservoir to a position generally adjacent to the golfers in the cart. Activation of the pump diffuses a mist of the liquid over golfers.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new golf cart cooling apparatus apparatus and method which has many of the advantages of the cooling devices mentioned heretofore and many novel features that result in a new golf cart cooling apparatus which is not anticipated, rendered obvious, suggested, or even implied by any of the prior art cooling devices, either alone or in any combination thereof.

It is another object of the present invention to provide a new golf cart cooling apparatus which may be easily and efficiently manufactured and marketed.

It is a further object of the present invention to provide a new golf cart cooling apparatus which is of a durable and reliable construction.

An even further object of the present invention is to provide a new golf cart cooling apparatus which is susceptible of a low cost of manufacture with regard to both materials and labor, and which accordingly is then susceptible of low prices of sale to the consuming public, thereby making such golf cart cooling apparatus economically available to the buying public.

Still yet another object of the present invention is to provide a new golf cart cooling apparatus which provides in the apparatuses and methods of the prior art some of the advantages thereof, while simultaneously overcoming some of the disadvantages normally associated therewith.

Still another object of the present invention is to provide a new golf cart cooling apparatus for cooling golfers seated in a golf cart.

Yet another object of the present invention is to provide a new golf cart cooling apparatus which includes a reservoir for holding a liquid such as water. A pump is provided for pumping the liquid out of the reservoir. The pump is in liquid communication with the reservoir by a tube or by being mounted on the reservoir. A conduit assembly is provided for spraying the liquid from the reservoir to a position generally adjacent to the golfers in the cart. Activation of the pump diffuses a mist of the liquid over golfers.

Still yet another object of the present invention is to provide a new golf cart cooling apparatus that utilizes a mist of liquid to cool the golfers without saturating the golfer's clothes.

Even still another object of the present invention is to provide a new golf cart cooling apparatus that allows individuals to play golf in warm temperatures more comfortably. The present invention also enables individuals, such as the elderly and the young, who are often times susceptible to illness due to the heat to play during warm weather.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
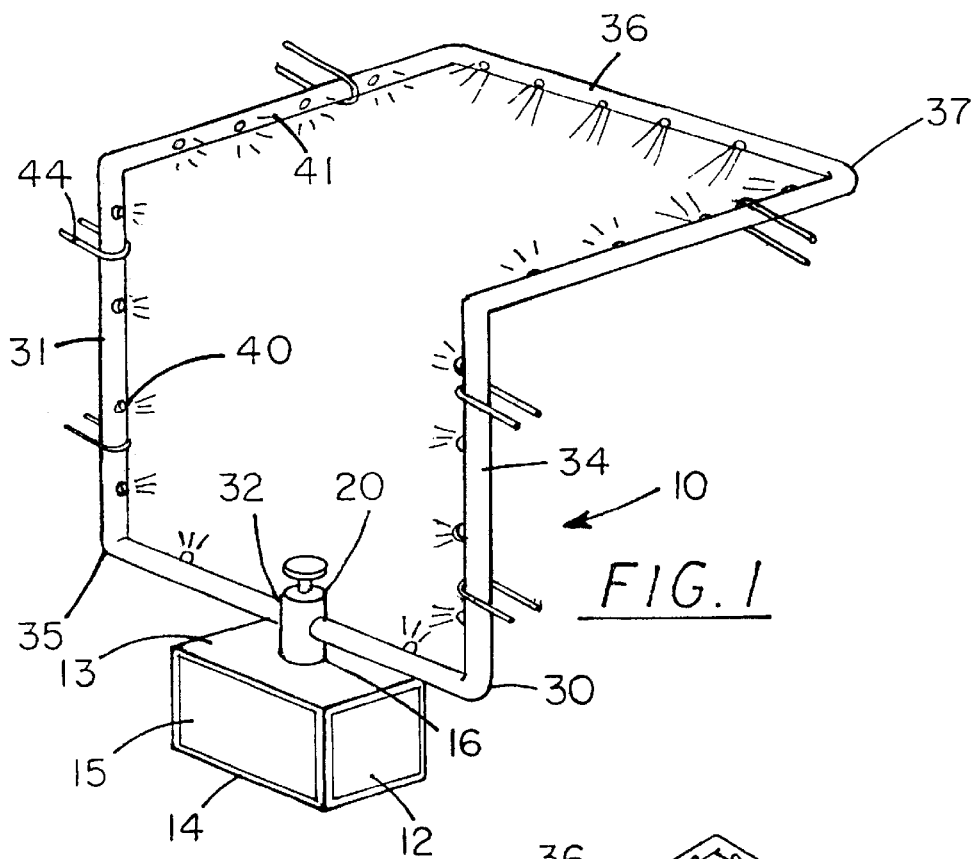
FIG. 1 is a schematic perspective view of a new golf cart cooling apparatus according to the present invention showing a reservoir, a pump and a conduit assembly being in fluid communication with each other.
Figure 3:
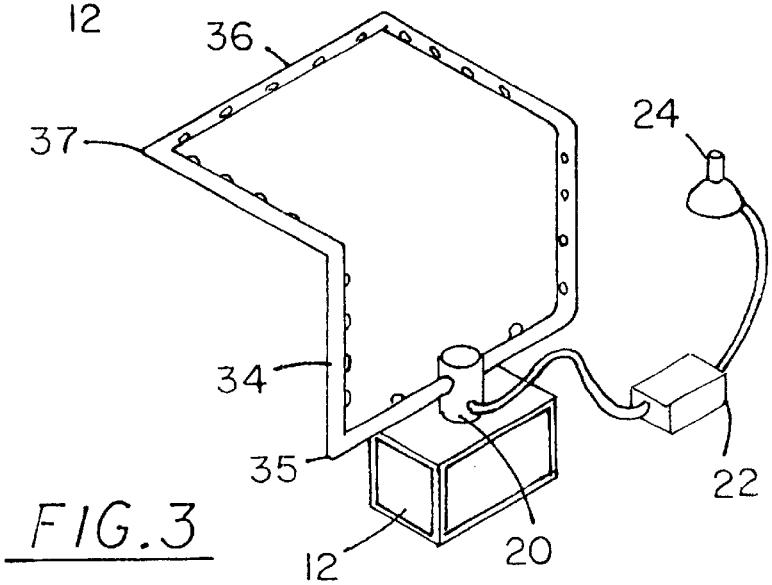
FIG. 3 is a schematic perspective view of the present invention showing an electrical pump in electrical communication with a power supply and a switch.
Figure 2:
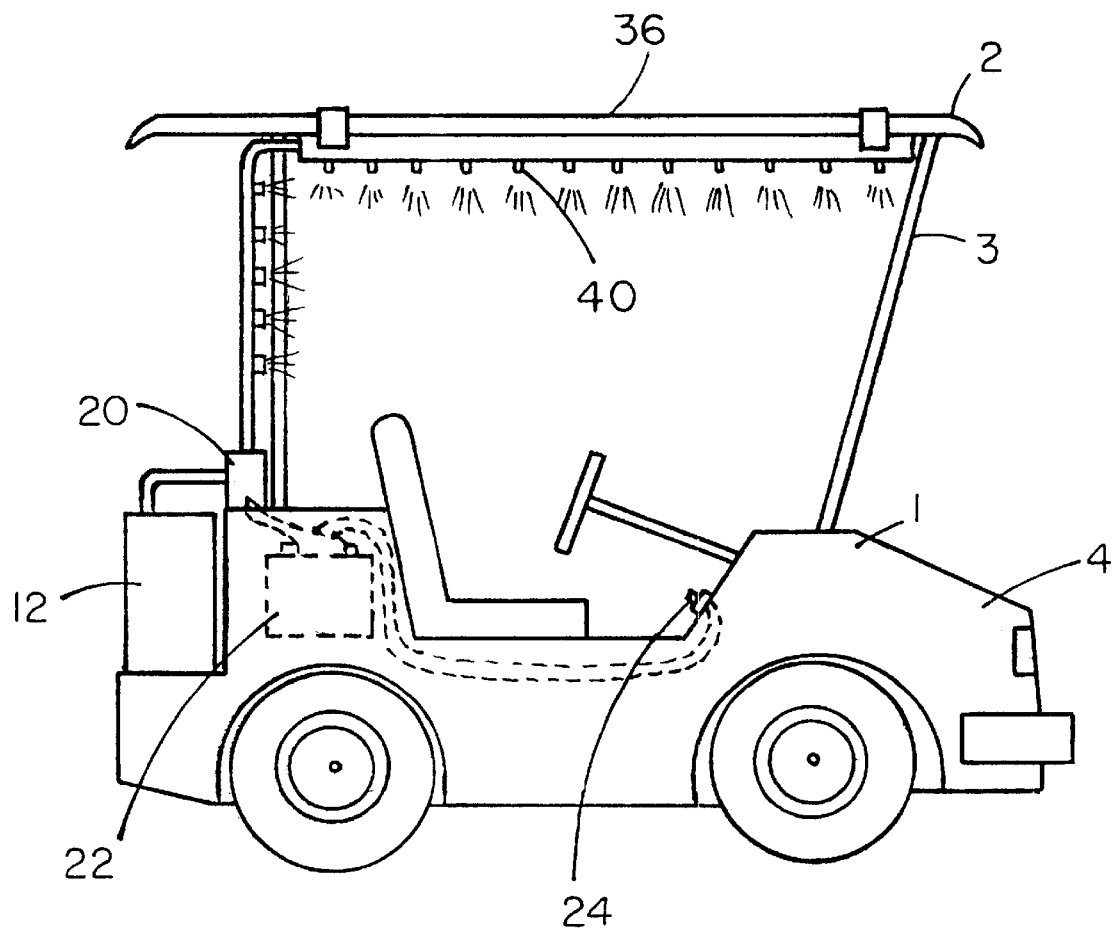
FIG. 2 is a schematic perspective view of the present invention showing the new golf cart cooling apparatus being mounted on a golf cart.

With reference now to the drawings, and in particular to FIGS. 1 through 3 thereof, a new golf cart cooling apparatus embodying the principles and concepts of the present invention and generally designated by the reference numeral 10 will be described.

As best illustrated in FIGS. 1 through 3, the golf cart cooling apparatus 10 generally comprises a reservoir 12 for holding a liquid, such as water. The reservoir 12 has a top wall 13 and a bottom wall 14. A peripheral wall 15 extends between the top 13 and bottom 14 walls defining an interior. The top wall 13 of the reservoir 12 may have a hole 16 extending therethrough. The reservoir 12 is mountable on a vehicle, such as a golfing cart 1, having a roof 2 attached to a plurality of upstanding members 3 that are mounted on a body 4 of the cart 1.

A pump 20 is provided for pumping the liquid out of the reservoir 12. The pump 20 may be mounted on the reservoir 12. The pump is in liquid communication with the reservoir 12, such that the pump 20 is capable of pumping the liquid from the reservoir 12. The pump 20 may comprise a manually operated pump 20, or an electrically powered pump 20 having a power supply 22 and a switch 24. The switch 24 is in electrical communication with the power supply 22 for selectively powering the pump 20.

A conduit assembly 30 is provided for spraying the liquid from the reservoir 12 to a position generally adjacent to the golfers seated in or even standing adjacent to the golf cart 1. The conduit assembly 30 comprises a tube 31 that has a pair of ends 32. In one embodiment, at least one of the ends 32 is fluidly coupled to an outlet of the pump 20. In one embodiment, both ends 32 of the tube 31 may be fluidly coupled to the pump 20 to define a continuous loop.

The continuous loop comprises a pair of side conduit portions 34 that are fluidly coupled to the pump 20. Each of the side conduit portions 34 may have a bend 35 therein such that each of the side conduit portions 34 may have a generally L-shape. Each of the side conduit portions 34 maybe orientated generally parallel to a longitudinal axis of the pump 20.

A linking conduit portion 36 may be provided for connecting each of the side conduit portions 34 together. The linking conduit portion 36 maybe orientated generally perpendicular to each of the side conduit portions 34 and parallel to the lower surface of the roof of the cart. The linking conduit portion may have a pair of bends 37 therein such that the linking conduit portion 36 has a generally U-shape. Each of the portions 34 and 36 may comprise a substantially rigid material, such as, for example, a metal or plastic material.

A plurality of nozzles 40 is provided for diffusing the liquid in each of the side conduit portions 34 and the linking conduit portion 36 into a mist form. Each of the nozzles 40 is fluidly coupled to an inner surface 41 of each of the side conduit portions 34 and the linking conduit portion 36. Each of the nozzles 40 is spaced apart from each other along each of the side conduit portions 34 and the linking conduit portion 36.

A fastening means maybe provided for releasably fastening the conduit assembly 30 to the golf cart 1. The fastening means may comprise a clamp 44.

In use, activation of the pump 20, either manually or by a switch 24 diffuses a mist of liquid over the golfers.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A golf cart cooling apparatus for mounting on a golf cart to cool golfers seated in the golf cart, the golf cart having a roof with a lower surface, said cooling apparatus comprising:

a reservoir for mounting on the golf cart to hold a liquid;

a pump for pumping liquid out of said reservoir, said pump being in liquid communication with said reservoir;

a conduit assembly for mounting on a roof of the golf cart to spray liquid from said reservoir to a position generally adjacent to the golfers in the cart;

wherein activation of said pump diffuses a mist of liquid over the golfers;

wherein said conduit assembly comprises a tube having a pair of ends, each of said ends being fluidly coupled to an outlet of said pump to define a continuous loop.

2. The cooling apparatus of claim 1, wherein said pump is mounted on a top wall of said reservoir.

3. The cooling apparatus of claim 1, wherein said pump comprises a manual pump.

4. The cooling apparatus of claim 1, wherein said pump comprises an electrical pump.

5. The cooling apparatus of claim 4, additionally comprising a power supply for powering said electrical pump, a switch in communication with said power supply for selectively providing power to said electrical pump.

6. The cooling apparatus of claim 1, wherein said continuous loop comprises a pair of side conduit portions being coupled to said pump.

7. The cooling apparatus of claim 6, wherein said continuous loop comprises a linking conduit portion for connecting each of said side conduit portions together.

8. The cooling apparatus of claim 1, additionally comprising:

a plurality of nozzles through which liquid is carried in said tube of said continuous loop and which exists said continuous loop a mist form, each of said nozzles being fluidly coupled to an inner surface of said tube, each of said nozzles being spaced apart from each other.

9. The cooling apparatus of claim 1, additionally comprising:

a fastening means for releasably fastening said conduit assembly to the golf cart.

10. A golf cart cooling apparatus for mounting on a golf cart to cool golfers seated in the golf cart, the golf cart having a roof with a lower surface being attached to a plurality of upstanding members being attached to and extending upwardly from a body of the cart, said cooling apparatus comprising:

a reservoir for holding a liquid, said reservoir having a top wall and a bottom wall, a peripheral wall extending between said top and bottom walls and defining an interior, said top wall of said reservoir having a hole extending therethrough, said reservoir being mountable on said cart;

a pump for pumping liquid out of said reservoir, said pump being mounted on and in liquid communication with said reservoir such that said pump is adapted to pump liquid from said reservoir;

a conduit assembly for spraying liquid from said reservoir to a position generally adjacent to the golfers in the cart, said conduit assembly comprising:

a tube having a pair of ends, each of said ends being fluidly coupled to a peripheral wall of said pump such that a continuous loop is defined, said continuous loop comprising:

a pair of side conduit portions being coupled to and extending away from said pump, each of said side conduit portions having a bend therein such that each of said side conduit portions has a generally L-shape, each of said side conduit portions being orientated generally parallel to a longitudinal axis of said pump;

a linking conduit portion for connecting each of said side conduit portions together, said linking conduit portion being orientated generally perpendicular to each of said side conduit portions and parallel to the lower surface of the roof of the cart, said linking conduit portion having a pair of bends therein such that said linking conduit portion has a generally U-shape; each of said portions comprising a substantially rigid material;

a plurality of nozzles for diffusing the liquid in each of said side conduit portions and said linking conduit portion into a mist form, each of said nozzles being fluidly coupled to an inner surface of each of said side conduit portions and said linking conduit portion, each of said nozzles being spaced apart from each other;

a fastening means for releasably fastening said conduit assembly to the golf cart, said fastening means comprising a clamp; and wherein activation of said pump diffuses a mist of liquid over the golfers.

11. A golf cart cooling system for cooling golfers seated in a golf cart, said system comprising:

a golf cart having a roof with a lower surface; and a cooling apparatus comprising:

a reservoir mounted on the golf cart for holding a liquid;

a pump for pumping liquid out of said reservoir, said pump being in liquid communication with said reservoir;

a conduit assembly mounted on the lower surface of said roof of said golf cart to spray liquid from said reservoir to a position below said roof and generally adjacent to golfers when the golfers are seated in the cart;

wherein said conduit assembly includes a pair of side conduit portions, each of said side conduit portions having an end fluidly coupled to an outlet of said pump.

\* \* \* \* \*